US012756033B2

(12) United States Patent
Bhandari et al.

(10) Patent No.: US 12,756,033 B2
(45) Date of Patent: Oct. 6, 2026

(54) COOLING ASSEMBLY FOR A BATTERY PACK

(71) Applicant: GM Global Technology Operations LLC, Detroit, MI (US)

(72) Inventors: Abhay Ranchoddas Bhandari, Troy, MI (US); Alec Hans Husemeier, Shelby Township, MI (US); Cody Miller, Midland, MI (US); Kannan Murugesan, Rasipuram (IN)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 491 days.

(21) Appl. No.: 18/473,693

(22) Filed: Sep. 25, 2023

(65) Prior Publication Data

US 2025/0105398 A1 Mar. 27, 2025

(51) Int. Cl.

| | |
|---|---|
| ***H01M 10/6568*** | (2014.01) |
| ***B60H 1/00*** | (2006.01) |
| ***H01M 10/613*** | (2014.01) |
| ***H01M 10/643*** | (2014.01) |
| ***H01M 10/6555*** | (2014.01) |
| ***H01M 10/6557*** | (2014.01) |
| ***H01M 50/213*** | (2021.01) |

(52) U.S. Cl.

CPC .... *H01M 10/6568* (2015.04); *B60H 1/00278* (2013.01); *H01M 10/613* (2015.04); *H01M 10/643* (2015.04); *H01M 10/6555* (2015.04); *H01M 10/6557* (2015.04); *H01M 50/213* (2021.01); *H01M 2220/20* (2013.01)

(58) Field of Classification Search

CPC ........................ H01M 10/6568; H01M 10/643

See application file for complete search history.

(56) References Cited

U.S. PATENT DOCUMENTS

| | | | | |
|---|---|---|---|---|
| 8,895,173 | B2 | 11/2014 | Gandhi et al. | |
| 10,003,112 | B1 | 6/2018 | Boor et al. | |
| 2005/0170240 | A1* | 8/2005 | German | H01M 10/613 429/120 |
| 2008/0311468 | A1* | 12/2008 | Hermann | B60L 50/64 429/120 |
| 2018/0051938 | A1* | 2/2018 | Espersen | F28D 15/043 |
| 2021/0280930 | A1* | 9/2021 | Bergnach | H01M 10/6554 |

FOREIGN PATENT DOCUMENTS

| | | | |
|---|---|---|---|
| WO | WO-2019046012 A1 * | 3/2019 | H01M 10/6567 |

* cited by examiner

*Primary Examiner* — Galen H Hauth

(74) *Attorney, Agent, or Firm* — Vivacqua Crane, PLLC

(57) ABSTRACT

A cooling assembly for a battery pack having at least one cylindrical battery cell includes a manifold having an inlet line for receiving a coolant and an outlet line for discharging the coolant, a ribbon header connected to the manifold and having a feed line in fluid communication with the inlet line and a return line in fluid communication with the outlet line, a ribbon in contact with the cylindrical battery cell and defining an outgoing channel and a return channel therethrough, wherein the ribbon is connected to the ribbon header and the outgoing channel is in fluid communication with the feed line and the return channel is in fluid communication with the return line, and a spacer plate disposed between the manifold and the ribbon header.

12 Claims, 5 Drawing Sheets

COOLING ASSEMBLY FOR A BATTERY PACK

INTRODUCTION

The present disclosure relates to a cooling assembly for a battery pack. More particularly, the present disclosure relates to cooling assembly for a ribbon cooled battery pack.

Electric vehicles and hybrid vehicles employ a high voltage electric battery system that includes a number of battery cells. These electric and hybrid vehicles typically require several battery cells to provide enough power to meet vehicle power and energy requirements. The battery cells are often located under the vehicle body midway between the front and rear wheels.

Battery cells, particularly of the high-voltage type described above, generate substantial amounts of heat during sustained operation. Over time, the generated heat may degrade the efficiency and the overall structural integrity of the battery pack. Thermal management systems are therefore used to closely regulate the temperature of the battery pack. In one type of thermal management system, heat transfer fluid is circulated to and from fins or ribbons interspaced between the battery cells. While effective, there is a need in the art for improved coolant system designs.

SUMMARY

A cooling assembly for a battery pack having at least one cylindrical battery cell is provided. The cooling assembly includes a manifold having an inlet line for receiving a coolant and an outlet line for discharging the coolant, a ribbon header connected to the manifold and having a ribbon feed line in fluid communication with the inlet line and a ribbon return line in fluid communication with the outlet line, and a ribbon in contact with the cylindrical battery cell and defining an outgoing channel and a return channel therethrough. The ribbon is connected to the ribbon header and the outgoing channel is in fluid communication with the ribbon feed line and the return channel is in fluid communication with the ribbon return line. A spacer plate is disposed between the manifold and the ribbon header. The coolant flows from the inlet line of the manifold to the ribbon feed line of the ribbon header to the outgoing channel of the ribbon to cool the cylindrical battery cell, and the coolant flows from the outgoing channel to the return channel and through the ribbon return line of the ribbon header to the outlet line of the manifold.

In one aspect, the ribbon is connected to a front surface of the ribbon header.

In another aspect, the manifold is connected to the ribbon header by at least one mechanical fastener extending parallel to the front surface and through the spacer plate, thereby preventing forces from being transferred to the ribbon during assembly of the manifold to the ribbon header.

In another aspect, the front surface includes a slot defined by parallel flanges extending out from the front surface, and a proximal end of the ribbon is disposed within the slot.

In another aspect, a ribbon feed port is disposed within the slot at the front surface and a ribbon return port disposed within the slot at the front surface, the ribbon feed port in communication with the ribbon feed line and the outgoing channel of the ribbon and the ribbon return port in communication with the ribbon return line and the return channel of the ribbon.

In another aspect, a vertical feed line and a first connecting line is disposed within the ribbon header, wherein the vertical feed line communicates with the inlet line of the manifold and the first connecting line communicates between the vertical feed line and the ribbon feed line.

In another aspect, a vertical return line and a second connecting line is disposed within the ribbon header, wherein the vertical return line communicates with the outlet line of the manifold and the second connecting line communicates between the vertical return line and the ribbon return line.

In another aspect, the manifold is comprised of a composite material.

In another aspect, the spacer plate includes a frame having a plurality of windows and a gasket disposed along an edge of the plurality of windows to seal the manifold to the ribbon header.

In another aspect, the inlet line includes a feed port extending to a bottom surface of the manifold, and the outlet line includes a return port extending to the bottom surface of the manifold, wherein the ribbon header includes a ribbon header inlet and a ribbon header outlet each disposed in a top surface of the ribbon header, the ribbon header inlet in fluid communication with the feed port and the ribbon feed line and the ribbon header outlet in fluid communication with the return port and the ribbon return line.

In another aspect, one of the plurality of windows in the spacer plate is aligned with the feed port and the ribbon header inlet, and another of the plurality of windows is aligned with the return port and the ribbon header outlet.

In another embodiment, a battery pack is provided. The battery pack includes a battery tray, a plurality of cylindrical battery cells supported on the battery tray, and a cooling assembly. The cooling assembly includes a manifold having an inlet line for receiving a coolant and an outlet line for discharging the coolant, the inlet line having a plurality of feed ports extending to a bottom surface of the manifold, and the outlet line having a plurality of return ports extending to the bottom surface of the manifold, a plurality of ribbon headers each connected to the bottom surface of the manifold and each having a ribbon feed line in fluid communication with one of the feed ports and a ribbon return line in fluid communication with one of the return ports, and a plurality of ribbons in contact with the plurality of cylindrical battery cells and each defining an outgoing channel and a return channel therethrough. Each of the plurality of ribbons is connected to a respective one of the plurality of ribbon headers and each of the outgoing channels is in fluid communication with the ribbon feed line of the respective one of the plurality of ribbon headers and each of the return channels is in fluid communication with the ribbon return line of the respective one of the plurality of ribbon headers. A spacer plate is disposed between the manifold and the plurality of ribbon headers, the spacer plate configured to seal the manifold to the plurality of ribbon headers. The coolant flows from the inlet line of the manifold to the ribbon feed lines of the plurality of ribbon headers via the feed ports, and for each of the plurality of ribbon headers, the coolant flows to the outgoing channel of the respective one of the plurality of ribbons to cool the cylindrical battery cell, and the coolant flows from the outgoing channel to the return channel and through the ribbon return lines of the plurality of ribbon headers to the outlet line of the manifold via the return ports.

In one aspect, each of the plurality of ribbons is connected to a front surface of the respective one of the plurality of ribbon headers.

In another aspect, the manifold is connected to the plurality of ribbon headers by a plurality of mechanical fasteners each extending parallel to the front surfaces and through the spacer plate, thereby preventing forces from being transferred to the plurality of ribbons during assembly of the manifold to the plurality of ribbon headers.

In another aspect, each of the front surfaces includes a slot defined by parallel flanges extending out from the front surface, and a proximal end of one of the plurality of ribbons is disposed within each of the slots.

In another aspect, a ribbon feed port is disposed within the slot at the front surface and a ribbon return port disposed with the slot at the front surface, the ribbon feed port in communication with the ribbon feed line and the outgoing channel of one of the plurality of ribbons and the ribbon return port in communication with the ribbon return line and the return channel of one of the plurality of ribbons.

In another aspect, a vertical feed line and a first connecting line is disposed within each of the plurality of ribbon headers, wherein the vertical feed line communicates with the inlet line of the manifold and the first connecting line communicates between the vertical feed line and the ribbon feed line.

In another aspect, a vertical return line and a second connecting line is disposed within each of the plurality of ribbon headers, wherein the vertical return line communicates with the outlet line of the manifold and the second connecting line communicates between the vertical return line and the ribbon return line.

In another aspect, the manifold is comprised of a composite material.

A battery thermal management system for a cylindrical battery cell is provided. The battery thermal management system includes a recovery tank storing a coolant, a pump in fluid communication with the recovery tank for pumping the coolant, and a cooling assembly. The cooling assembly includes a manifold having an inlet line in fluid communication with the pump for receiving the coolant and an outlet line for discharging the coolant, a ribbon header connected to the manifold and having a feed line in fluid communication with the inlet line and a return line in fluid communication with the outlet line, a ribbon in contact with the cylindrical battery cell and defining an outgoing channel and a return channel therethrough, wherein the ribbon is connected to the ribbon header and the outgoing channel is in fluid communication with the feed line and the return channel is in fluid communication with the return line, a spacer plate disposed between the manifold and the ribbon header, and a heat exchanger in fluid communication with the outlet line of the manifold and the recovery tank. The coolant is pumped by the pump to the inlet line of the manifold, the coolant flows from the inlet line of the manifold to the feed line of the ribbon header to the outgoing channel of the ribbon to cool the cylindrical battery cell, and the coolant flows from the outgoing channel to the return channel and through the return line of the ribbon header to the outlet line of the manifold, and from the outlet line to the heat exchanger and then to the recovery tank.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
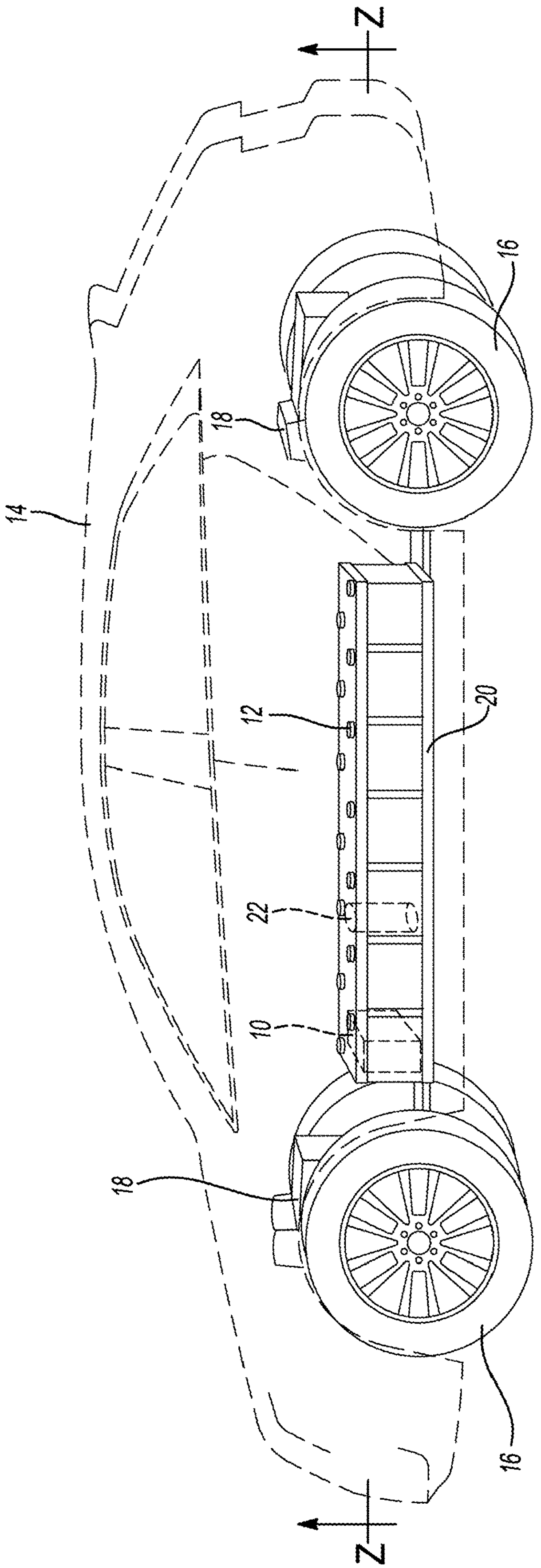
FIG. 1 is schematic view of an exemplary motor vehicle having a battery pack with a cooling assembly according to the principles of the present disclosure.

Referring to FIG. 1, a cooling assembly 10 for a battery pack 12 according to the principles of the present disclosure is shown. The cooling assembly 10 is configured to provide cooling to the battery pack 12, as will be described in greater detail below. The battery pack 12 is illustrated with an exemplary vehicle 14. The vehicle 14 is preferably an electric vehicle or hybrid vehicle having wheels 16 driven by electric motors/inverters 18. The electric motors/inverters 18 receive motive power from the battery pack 12. While the vehicle 14 is illustrated as a passenger road vehicle, it should be appreciated that the cooling assembly 10 and the battery pack 12 may be used with various other types of vehicles. For example, cooling assembly 10 and the battery pack 12 may be used in nautical vehicles, such as boats, or aeronautical vehicles, such as drones or passenger airplanes. Moreover, the cooling assembly 10 and the battery pack 12 may be used as a stationary power source separate and independent from a vehicle.

The battery pack 12 generally includes a battery tray 20 connected to the vehicle 14. The battery tray 20 provides structural support to one or a plurality of battery cells 22 (only one of which is shown) disposed within the battery pack 12. The battery cells 22 are preferably cylindrical lithium-ion battery cells. However, it should be appreciated that any type of battery cell 22 may be employed so long as the battery cell 22 is compatible with the cooling assembly 10.

Figure 2:
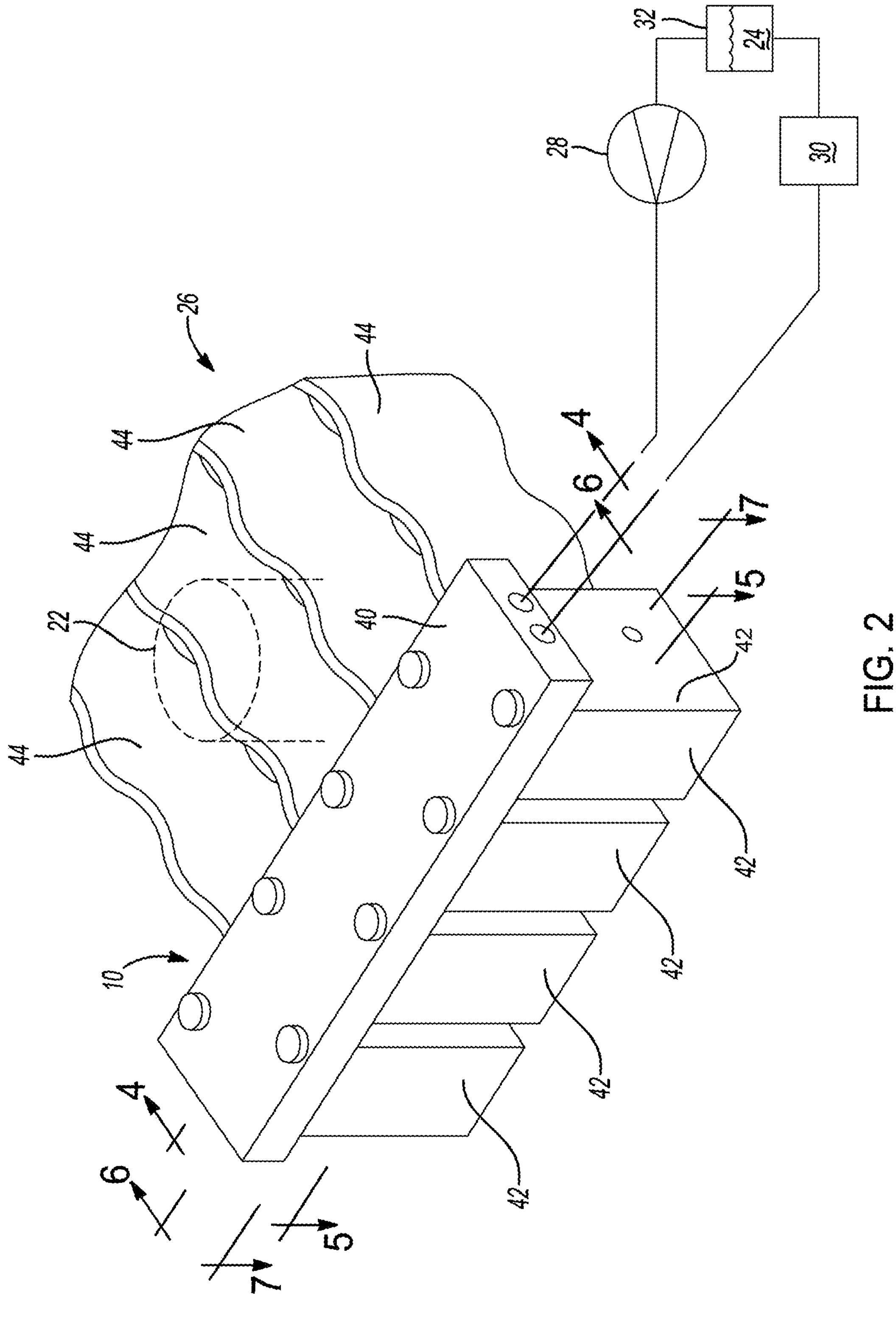
FIG. 2 is a top perspective view of the cooling assembly.
Figure 3:
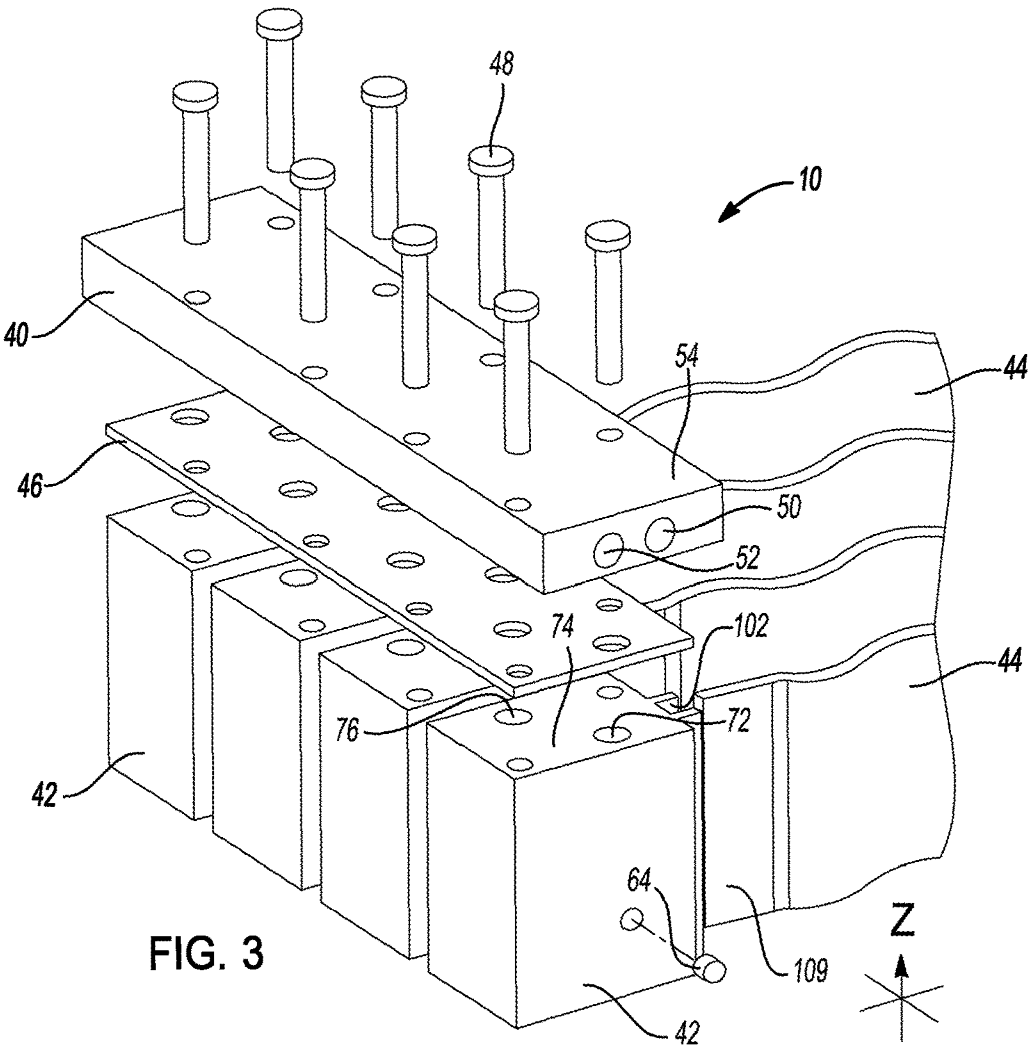
FIG. 3 is a top perspective exploded view of the cooling assembly.

Referring now to FIGS. 2 and 3, the cooling assembly 10 is illustrated relative to an exemplary one of the battery cells 22. The cooling assembly 10 is configured to circulate a coolant 24 therethrough in order to cool the battery cells 22 via heat transfer. The cooling assembly 10 forms part of a larger battery thermal management system 26 that generally includes a pump 28, a heat exchanger 30, and a recovery tank 32. The battery thermal management system 26 may include various other components including temperature and humidity sensors, valves, and electronic controllers, without departing from the scope of the present disclosure. Generally, the pump 28 is in fluid communication with the recovery tank 32 and pumps the coolant 24 from the recovery tank 32 to the cooling assembly 10. The cooling assembly 10 routes the coolant 24 to the battery cells 22 in order to cool the battery cells 22. The coolant 24 is subsequently returned from the cooling assembly 10 and communicated to the heat exchanger 30. The heat exchanger 30 removes heat from the coolant 24, for example, using a liquid to air heat exchanger with a fan, though other types of heat exchangers may be employed. The coolant 24 is returned to the recovery tank 32.

The cooling assembly 10 includes a manifold 40, one or a plurality of ribbon headers 42, one or a plurality of ribbons 44, and a spacer plate 46. The manifold 40 is connected to the ribbon headers 42 via one or more mechanical fasteners 48. The ribbons 44 are each individually connected to a respective one of the ribbon headers 42. The spacer plate 46 is disposed between the manifold 40 and the ribbon headers 42. Each of these components will be described in greater detail below.

The manifold 40 is configured to route the coolant 24 received from the pump 28 to each of the ribbon headers 42. The manifold is made from a composite, for example glass-filled nylon. Various other composite materials may be used and are selected to reduce weight and to be compatible with the coolant 24. The manifold 40 includes an inlet 50 and an outlet 52 disposed in an end 54 of the manifold 40. The inlet 50 communicates with an inlet line 56 (FIG. 4) that extends through an entire length of the manifold 40. The outlet 52 communicates with an outlet line 58 (FIG. 6) that extends through the entire length of the manifold 40. The inlet line 56 and the outlet line 58 are preferably thru holes drilled in the manifold and extend parallel to one another. An end 60 of the inlet line 56 opposite the inlet 50 and an end 62 of the outlet line 58 opposite the outlet 52 may each be connected to additional pumps, heat exchangers, and recovery tanks or may be sealed with plugs 64.

Figure 4:
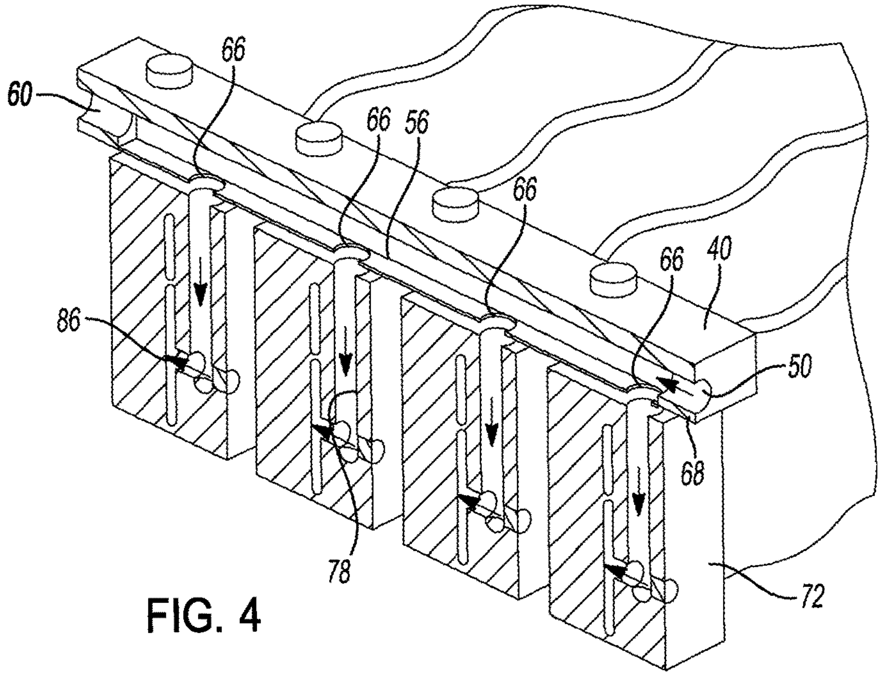
FIG. 4 is a cross-sectional view of the cooling assembly viewed in the direction of arrows 4-4 in FIG. 2.

With reference to FIG. 4, the inlet line 56 includes one or more feed ports 66 that extend through to a bottom surface 68 of the manifold 40. The number of feed ports 66 corresponds to the number of ribbon headers 42 and the number of ribbons 44. Therefore, in the example provided, there are four feed ports 66. However, it should be appreciated that one or more ribbon headers 42 and ribbons 44 may be employed.

Figure 6:
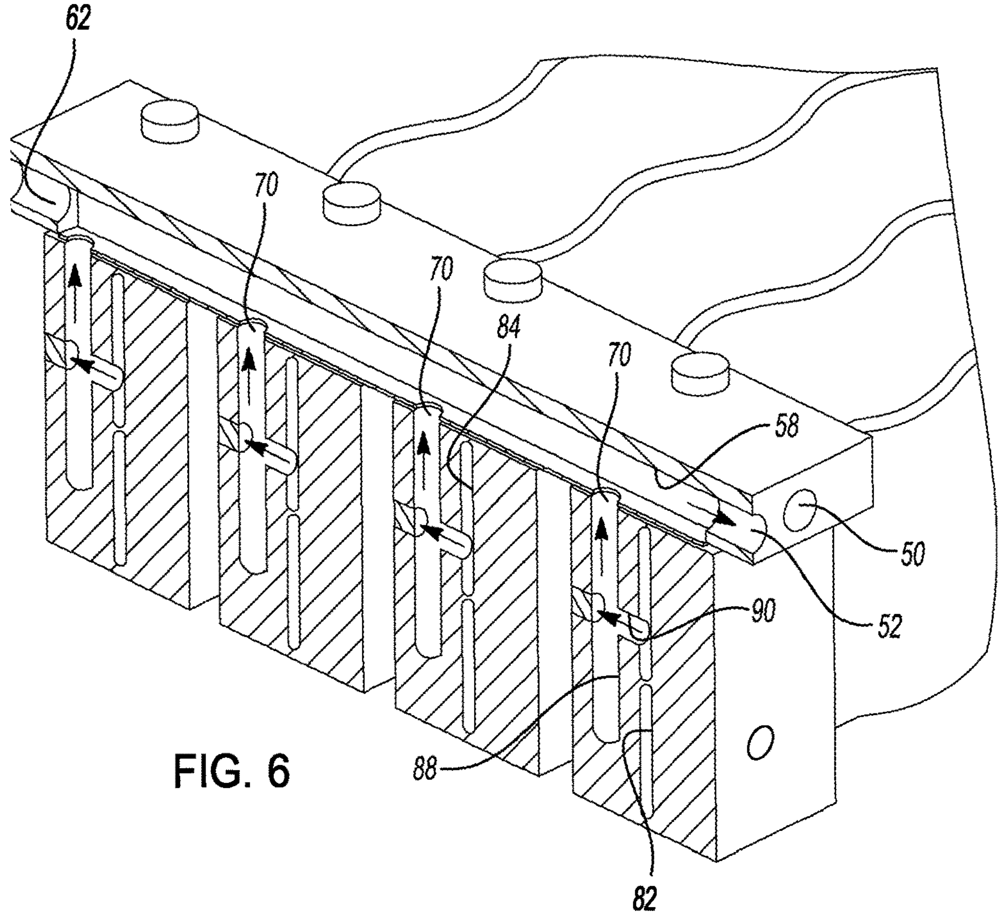
FIG. 6 is a cross-sectional view of the cooling assembly viewed in the direction of arrows 6-6 in FIG. 2.

With reference to FIG. 6, the outlet line 58 includes one or more return ports 70 that extend through to the bottom surface 68 of the manifold 40. The number of return ports 70 corresponds to the number of ribbon headers 42 and the number of ribbons 44.

Returning to FIG. 3, the ribbon headers 42 are configured to route the coolant 24 received from the manifold 40 to a corresponding ribbon 44. The ribbon headers 42 are connected to the manifold 40 at the bottom surface 68 of the manifold 40. Each of the ribbon headers 42 are identical and therefore only one will be described. The ribbon header 42 is preferably made from a die-cast metal. The ribbon header 42 includes a ribbon header inlet 72 disposed on an upper surface 74 of the ribbon header 42. The ribbon header inlet 72 is in fluid communication with the feed port 66 of the manifold 40 for receiving the coolant 24. A ribbon header outlet 76 is disposed on the upper surface 74 of the ribbon header 42. The ribbon header outlet 76 is in fluid communication with the return port 70 of the manifold 40 for discharging the coolant 24 back to the manifold 40.

Figure 5:
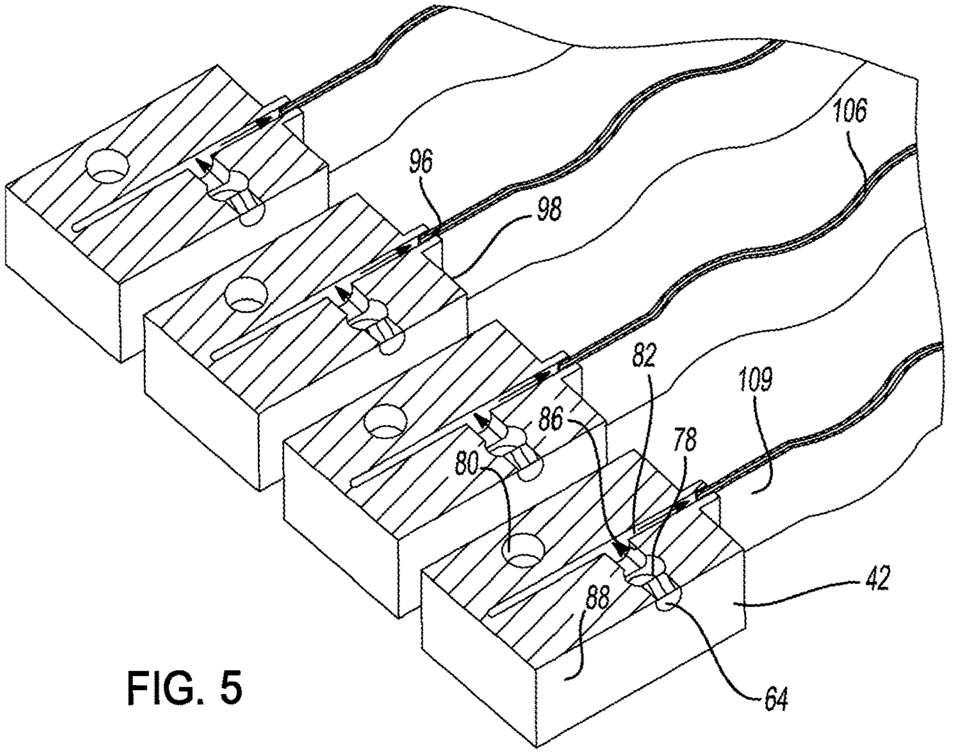
FIG. 5 is a cross-sectional view of the cooling assembly viewed in the direction of arrows 5-5 in FIG. 2.
Figure 7:
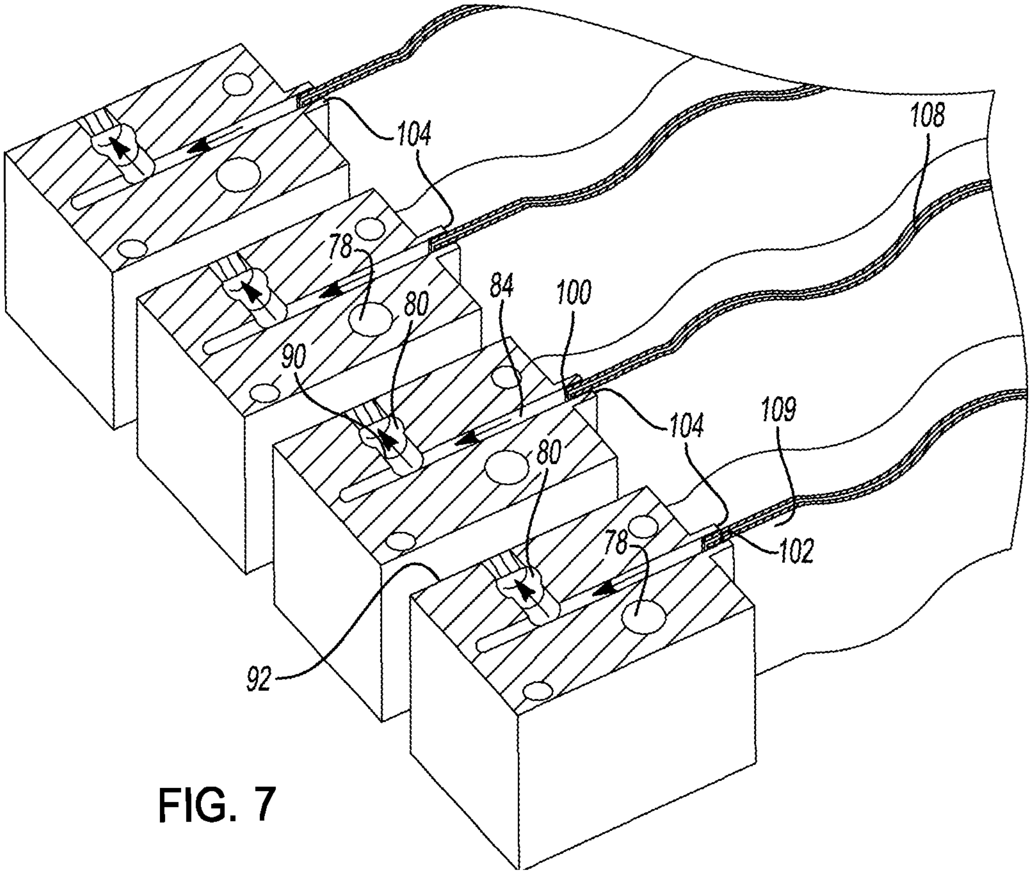
FIG. 7 is a cross-sectional view of the cooling assembly viewed in the direction of arrows 7-7 in FIG. 2.

With reference to FIGS. 5 and 7, the ribbon header inlet 72 communicates with a vertical feed line 78 that extends through an entire height (in the Z-direction) of the ribbon header 42. The ribbon header outlet 76 communicates with a vertical return line 80 (FIG. 6) that extends through the height (in the Z-direction shown in FIGS. 1 and 3) of the ribbon header 42. The vertical feed line 78 and the vertical return line 80 are preferably thru holes drilled in the ribbon header 42 and extend parallel to one another.

The ribbon header 42 further includes a ribbon feed line 82 (FIG. 5) and a ribbon return line 84 (FIG. 7). Both the ribbon feed line 82 and the ribbon return line 84 are disposed between the vertical feed line 78 and the vertical return line 80. The ribbon feed line 82 communicates with the vertical feed line 78 via a first connecting line 86 (FIG. 5). The first connecting line 86 is a thru hole drilled into a side 88 of the ribbon header 42, through the vertical feed line 78, and to the ribbon feed line 82. One of the plugs 64 is disposed in an end of the first connecting line 86 to seal the first connecting line 86 from the outside environment. Likewise, the ribbon return line 84 communicates with the vertical return line 80 via a second connecting line 90 (FIG. 7). The second connecting line 90 is a thru hole drilled into a side 92 of the ribbon header 42, through the vertical return line 80, and to the ribbon return line 84. One of the plugs 64 is disposed in an end of the second connecting line 90 to seal the second connecting line 90 from the outside environment.

The ribbon feed line 82 communicates with a ribbon feed port 96 (FIG. 5) disposed on a front surface 98 of the ribbon header 42. The ribbon return line 84 communicates with a ribbon return port 100 disposed on the front surface 98. Both the ribbon feed port 96 and the ribbon return port 100 are disposed within a slot 102 formed by parallel flanges 104 extending our from the front surface 98. The slot 102 is sized to receive the ribbon 44 therein.

With continued reference to FIGS. 5 and 7, the ribbon 44 is configured to circulate the coolant 24 to the battery cells 22 in order to transfer heat from the battery cells 22 to the coolant 24. The ribbon 44 is preferably made of aluminum and has an elongated, wavy shape that corresponds to the outside surface of the battery cells 22 (see FIG. 2). The ribbon 44 is bifurcated along a length thereof, with an outgoing channel 106 disposed therein and located beneath a separate return channel 108 disposed therein. The outgoing channel 106 communicates with the return channel 108 at a distal end (not shown) of the ribbon 44. Thus, coolant 24 is able to travel along the entire length of the ribbon 44 via the outgoing channel 106 to the distal end and return the entire length of the ribbon 44 via the return channel 108. The battery cell 22, in contact with the ribbon 44, exchanges heat with the coolant 24 as it travels through the ribbon 44. A proximal end 109 of the ribbon 44 is disposed within the slot 102 of the ribbon header 42 such that the outgoing channel 106 communicates with the ribbon feed port 96 and the return channel 108 communicates with the ribbon return port 100. The ribbon 44 is preferably welded to the ribbon header 42.

Figure 8:
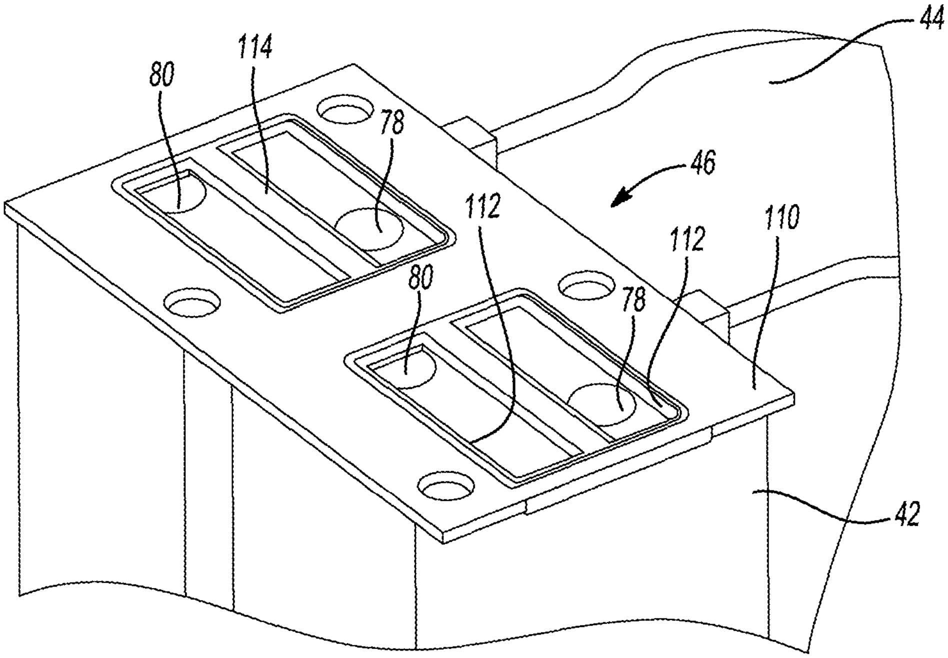
FIG. 8 is a top perspective view of a spacer plate in the cooling assembly.

Turning now to FIG. 8, the spacer plate 46 is configured to seal the manifold 40 to the ribbon headers 42. The spacer plate 46 includes a frame 110. The frame 110 is preferably made of metal, for example steel. A plurality of windows 112 are disposed within the frame 110. The windows 112 are aligned with the ribbon header inlets 72 and the ribbon header outlets 76 as well as the feed ports 66 and return ports 70 of the manifold 40. In one aspect, the windows 112 are larger than the ribbon header inlets 72, the ribbon header outlets 76, the feed ports 66, and return ports 70 in order to allow easier alignment during assembly. A plurality of gaskets 114 are connected to the frame 110 around edges of the windows 112. The gaskets 114 seal the feed ports 66 and ribbon header inlets 72 from the return ports 70 and ribbon header outlets 76. The gaskets 114 may be paper gaskets, edge bonded gaskets, or room temperature vulcanizing (RTV) gaskets.

With combined reference to FIGS. 2-8, during operation, coolant 24 is pumped from the pump 28 to the inlet line 56 of the manifold 40. The coolant 24 is then routed to each of the ribbon headers 42 via the feed ports 66. Within a given ribbon header 42, coolant 24 is received within the vertical feed line 78, routed through the first connecting line 86 to the ribbon feed line 82, and then on to the ribbon 44. The coolant 24 travels through the ribbon 44 in the outgoing channel 106 to the battery cells 22 and returns via the return channel 108. Battery cells 22 in contact with the ribbon 44 exchanges heat with the coolant 24 as it travels through the ribbon 44. The coolant 24 is returned to the ribbon return line 84 and is routed via the second connecting line 90 to the vertical return line 80. The coolant 24 is then communicated to the outlet line 58 of the manifold 40 via the return ports 70. The coolant 24 is then communicated to the heat exchanger 30 and returned to the recovery tank 32.

Returning to FIGS. 2-3, the cooling assembly 10 is assembled in the Z direction using the mechanical fasteners 48 to secure the manifold 40 to the ribbon headers 42. The mechanical fasteners 48 are disposed parallel to the front surface 98 of the ribbon header 42 and perpendicular to the bottom surface 68 of the manifold 40 and the upper surface 74 of the ribbon header 42. Therefore, any forces applied during assembly are in the Z direction (i.e. vertical direction relative to the vehicle 14 and battery pack 12) and these forces are not transferred to the ribbons 44, thus minimizing ribbon misalignment or offset during manufacturing of the cooling assembly 10. The arrangement of the manifold 40, ribbon headers 42, ribbons 44, spacer plate 46, and the specific arrangement of the fluid lines and channels simplifies assembly and improves fluid flow of the coolant 24 therethrough over the conventional art. The cooling assembly 10 of the present disclosure also allows for easier servicing of the seal of the spacer plate 46 and the use of a torque readout on the mechanical fasteners 48 for error-proofing.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A cooling assembly for a battery pack, the battery pack having at least one cylindrical battery cell, the cooling assembly comprising:

a manifold having an inlet line for receiving a coolant and an outlet line for discharging the coolant;

a ribbon header connected to the manifold and having a ribbon feed line in fluid communication with the inlet line and a ribbon return line in fluid communication with the outlet line;

a ribbon in contact with the cylindrical battery cell and defining an outgoing channel and a return channel therethrough, wherein the ribbon is connected to the ribbon header and the outgoing channel is in fluid communication with the ribbon feed line and the return channel is in fluid communication with the ribbon return line; and a spacer plate disposed between the manifold and the ribbon header, wherein the coolant flows from the inlet line of the manifold to the ribbon feed line of the ribbon header to the outgoing channel of the ribbon to cool the cylindrical battery cell, and the coolant flows from the outgoing channel to the return channel and through the ribbon return line of the ribbon header to the outlet line of the manifold, wherein the ribbon is connected to a front surface of the ribbon header, wherein the manifold is connected to the ribbon header by at least one mechanical fastener extending parallel to the front surface and through the spacer plate, thereby preventing forces from being transferred to the ribbon during assembly of the manifold to the ribbon header, wherein the front surface includes a slot defined by parallel flanges extending out from the front surface, and a proximal end of the ribbon is disposed within the slot, and further comprising a ribbon feed port disposed within the slot at the front surface and a ribbon return port disposed within the slot at the front surface, the ribbon feed port in communication with the ribbon feed line and the outgoing channel of the ribbon and the ribbon return port in communication with the ribbon return line and the return channel of the ribbon.

2. The cooling assembly of claim 1, further comprising a vertical feed line and a first connecting line disposed within the ribbon header, wherein the vertical feed line communicates with the inlet line of the manifold and the first connecting line communicates between the vertical feed line and the ribbon feed line.

3. The cooling assembly of claim 2, further comprising a vertical return line and a second connecting line disposed within the ribbon header, wherein the vertical return line communicates with the outlet line of the manifold and the second connecting line communicates between the vertical return line and the ribbon return line.

4. The cooling assembly of claim 1, wherein the manifold is comprised of a composite material.

5. The cooling assembly of claim 1, wherein the spacer plate includes a frame having a plurality of windows and a gasket disposed along an edge of the plurality of windows to seal the manifold to the ribbon header.

6. The cooling assembly of claim 5, wherein the inlet line includes a feed port extending to a bottom surface of the manifold, and the outlet line includes a return port extending to the bottom surface of the manifold, wherein the ribbon header includes a ribbon header inlet and a ribbon header outlet each disposed in a top surface of the ribbon header, the ribbon header inlet in fluid communication with the feed port and the ribbon feed line and the ribbon header outlet in fluid communication with the return port and the ribbon return line.

7. The cooling assembly of claim 6, wherein one of the plurality of windows in the spacer plate is aligned with the feed port and the ribbon header inlet, and another of the plurality of windows is aligned with the return port and the ribbon header outlet.

8. A battery pack comprising:

a battery tray;

a plurality of cylindrical battery cells supported on the battery tray;

a cooling assembly comprising:

a manifold having an inlet line for receiving a coolant and an outlet line for discharging the coolant, the inlet line having a plurality of feed ports extending to a bottom surface of the manifold, and the outlet line having a plurality of return ports extending to the bottom surface of the manifold;

a plurality of ribbon headers each connected to the bottom surface of the manifold and each having a ribbon feed line in fluid communication with one of the feed ports and a ribbon return line in fluid communication with one of the return ports;

a plurality of ribbons in contact with the plurality of cylindrical battery cells and each defining an outgoing channel and a return channel therethrough, wherein each of the plurality of ribbons is connected to a respective one of the plurality of ribbon headers and each of the outgoing channels is in fluid communication with the ribbon feed line of the respective one of the plurality of ribbon headers and each of the return channels is in fluid communication with the ribbon return line of the respective one of the plurality of ribbon headers; and a spacer plate disposed between the manifold and the plurality of ribbon headers, the spacer plate configured to seal the manifold to the plurality of ribbon headers, wherein the coolant flows from the inlet line of the manifold to the ribbon feed lines of the plurality of ribbon headers via the feed ports, and for each of the plurality of ribbon headers, the coolant flows to the outgoing channel of the respective one of the plurality of ribbons to cool the cylindrical battery cell, and the coolant flows from the outgoing channel to the return channel and through the ribbon return lines of the plurality of ribbon headers to the outlet line of the manifold via the return ports wherein each of the plurality of ribbons is connected to a front surface of the respective one of the plurality of ribbon headers, wherein the manifold is connected to the plurality of ribbon headers by a plurality of mechanical fasteners each extending parallel to the front surfaces and through the spacer plate, thereby preventing forces from being transferred to the plurality of ribbons during assembly of the manifold to the plurality of ribbon headers, wherein each of the front surfaces includes a slot defined by parallel flanges extending out from the front surface, and a proximal end of one of the plurality of ribbons is disposed within each of the slots, and further comprising a ribbon feed port disposed within the slot at the front surface and a ribbon return port disposed with the slot at the front surface, the ribbon feed port in communication with the ribbon feed line and the outgoing channel of one of the plurality of ribbons and the ribbon return port in communication with the ribbon return line and the return channel of one of the plurality of ribbons.

9. The cooling assembly of claim 8, further comprising a vertical feed line and a first connecting line disposed within each of the plurality of ribbon headers, wherein the vertical feed line communicates with the inlet line of the manifold and the first connecting line communicates between the vertical feed line and the ribbon feed line.

10. The cooling assembly of claim 9, further comprising a vertical return line and a second connecting line disposed within each of the plurality of ribbon headers, wherein the vertical return line communicates with the outlet line of the manifold and the second connecting line communicates between the vertical return line and the ribbon return line.

11. The cooling assembly of claim 8, wherein the manifold is comprised of a composite material.

12. A battery thermal management system for a cylindrical battery cell, comprising:

a recovery tank storing a coolant;

a pump in fluid communication with the recovery tank for pumping the coolant;

a cooling assembly comprising:

a manifold having an inlet line in fluid communication with the pump for receiving the coolant and an outlet line for discharging the coolant;

a ribbon header connected to the manifold and having a feed line in fluid communication with the inlet line and a return line in fluid communication with the outlet line;

a ribbon in contact with the cylindrical battery cell and defining an outgoing channel and a return channel therethrough, wherein the ribbon is connected to the ribbon header and the outgoing channel is in fluid communication with the feed line and the return channel is in fluid communication with the return line; and a spacer plate disposed between the manifold and the ribbon header;

wherein each of the plurality of ribbons is connected to a front surface of the respective one of the plurality of ribbon headers, wherein the manifold is connected to the plurality of ribbon headers by a plurality of mechanical fasteners each extending parallel to the front surfaces and through the spacer plate, thereby preventing forces from being transferred to the plurality of ribbons during assembly of the manifold to the plurality of ribbon headers, wherein each of the front surfaces includes a slot defined by parallel flanges extending out from the front surface, and a proximal end of one of the plurality of ribbons is disposed within each of the slots, and further comprising a ribbon feed port disposed within the slot at the front surface and a ribbon return port disposed with the slot at the front surface, the ribbon feed port in communication with the ribbon feed line and the outgoing channel of one of the plurality of ribbons and the ribbon return port in communication with the ribbon return line and the return channel of one of the plurality of ribbons; and a heat exchanger in fluid communication with the outlet line of the manifold and the recovery tank, wherein the coolant is pumped by the pump to the inlet line of the manifold, the coolant flows from the inlet line of the manifold to the feed line of the ribbon header to the outgoing channel of the ribbon to cool the cylindrical battery cell, and the coolant flows from the outgoing channel to the return channel and through the return line of the ribbon header to the outlet line of the manifold, and from the outlet line to the heat exchanger and then to the recovery tank.

* * * * *